US006978247B1

(12) United States Patent
Bogart et al.

(10) Patent No.: US 6,978,247 B1
(45) Date of Patent: Dec. 20, 2005

(54) MULTIMEDIA CUSTOMER CARE CENTER HAVING A LAYERED CONTROL ARCHITECTURE

(75) Inventors: Frank J. Bogart, Boulder, CO (US); Camille Gabriel, Westminister, CO (US); Sarah Hildebrandt Kiefhaber, Boulder, CO (US); Gary S. King, Broomfield, CO (US); Rebecca Kay Phelps, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 805 days.

(21) Appl. No.: 09/588,963

(22) Filed: Jun. 7, 2000

(51) Int. Cl.$^7$ ............................................. G06F 17/60

(52) U.S. Cl. ...................... 705/8; 705/9; 705/7; 705/1

(58) Field of Search ............................ 705/10, 9, 8, 7, 705/1

(56) References Cited

U.S. PATENT DOCUMENTS

| | | | |
|---|---|---|---|
| 4,546,468 A | 10/1985 | Christmas et al. | 370/54 |
| 4,763,317 A | 8/1988 | Lehman et al. | 370/58 |
| 5,193,110 A | 3/1993 | Jones et al. | 379/94 |
| 5,802,163 A | 9/1998 | Miloslavsky | 379/265 |
| 5,878,130 A | 3/1999 | Andrews et al. | 379/265 |
| 5,915,012 A | 6/1999 | Miloslavsky | 379/220 |
| 6,021,428 A | 2/2000 | Miloslavsky | 709/206 |
| 6,108,711 A * | 8/2000 | Beck et al. | 709/242 |
| 6,470,227 B1 * | 10/2002 | Rangachari et al. | 700/95 |

OTHER PUBLICATIONS

D.A. Spencer and K.W. Howard, "DEFINITY® Enterprise Communications Server ATM Integration", *Bell Labs Technical Journal*, Apr.-Jun. 1999, pp. 21-42.
Genesys Telecommunications Laboratories, Inc., "About Enterprise Computer Telephony Integration—Application Note: Framework", brochure 4 pages.
Genesys Telecommunications Laboratories, Inc., "About Genesys T-Server Framework—Product Note: Framework", brochure, 4 pages.

(Continued)

*Primary Examiner*—John W. Hayes
*Assistant Examiner*—Akiba Robinson-Boyce
(74) *Attorney, Agent, or Firm*—David Volejnicek

(57) ABSTRACT

The architecture of a multimedia customer care center (100) is divided into three separate application layers: a contact layer (104), a communications layer (106) and a business layer (108). The contact layer comprises media-specific handlers (200–212) that manage their media-specific resources, connect customer contacts to resources (220) and report events, including status to the communications layer. The communication includes media-independent software (106) that manages shared resources, that tracks, accumulates, and reports events reported by the contact layer, and that directs handling of events by the contact layer according to business information. The business layer includes software (108) that provides an interface to the customer contact center for the business that is served by the center. It manages business services by supplying business information that defines the services and business goals to the communications layer, and generates reports from information accumulated by the communications layer. It effects scheduling and adherence tracking of resources. It also provides workflow control capability or interfaces to pre-existing workflow systems.

25 Claims, 11 Drawing Sheets

OTHER PUBLICATIONS

"Genesys Suite T-Server Framework" web page (3).
"Genesys Suite—Technology and Architecture" web page (1).
GeoTel, "Intelligent CallRouter" brochure, 12 pages.
GeoTel, "Intelligent CallRouter Overview" web page (7).
GeoTel, "Call Routing Benefits" web page, (6).
GeoTel, "Call Routing Strategies" web page, (6).
"Zippy" Grigonis, "Intersis' VOIXX—The Grand Unification (Of Messaging, That Is)", Computer Telephony, Nov. 1998, pp. 60, 62.
"Aubeta Telecom", IP Telephony, Nov. 1998, pp. 145-146.
The Vantive Corporation, "The Vantive Enterprise" brochure (5 pages).
The Vantive Enterprise: Vantive Products web page (2).

* cited by examiner

MULTIMEDIA CUSTOMER CARE CENTER HAVING A LAYERED CONTROL ARCHITECTURE

TECHNICAL FIELD

This invention relates to customer care centers, also referred to as call centers or automatic call distribution systems.

BACKGROUND OF THE INVENTION

Automatic call distribution (ACD) systems and the call centers that are built around them have traditionally been designed to distribute incoming or outgoing voice telephone calls of a business among a pool of agents for handling. However, recent technical and social advances require a reconsideration of how call centers are designed. They include the following:

More and more businesses want to blend the handling of incoming and outgoing calls, and to do so efficiently.

Maturing and widespread use of the Internet has increased the amount of electronic mail that businesses receive from customers, and these transactions need to be measured, tracked, and handled in ways similar to voice calls.

As access to the Internet has become common through Web browsers, businesses have found that Web pages are an important point of contact with customers and provide electronic commerce opportunities that need to be handled, measured, and tracked in ways similar to voice calls.

There is an industry-wide trend to move the formulation of call-center goals from efficiency alone to treating individual customers in ways that are uniquely suited to their individual needs and preferences while still using business resources in an efficient way.

Despite the need for call-center design reconsideration in light of these factors, the prior art that is known to the inventors consists of voice-only solutions or the adaptation of these voice-only solutions to force-fit other media into the same design. This results in the use of the voice-only solutions as an expedient but inadequate way of solving the broader problem. New media also require tracking of information that is nonexistent or not tracked in voice-only designs. Voice call centers must be either specially adapted to track this information, or must forego tracking of this information and do without it. Other adaptations require that all media be converted to a common format rather than supporting the hardware and/or software that is best suited for each medium.

SUMMARY OF THE INVENTION

This invention is directed to solving these and other problems and disadvantages of the prior art. Generally according to the invention, a customer care center comprises three separate application layers: a contact layer, a communications layer, and a business layer. The contact layer comprises a plurality of media-specific handlers for managing contacts in a plurality of communications media with customers of a business served by the customer care center. Each handler is adapted to handle a specific one or more media. Managing the contacts includes connecting the contacts to resources for servicing, collecting and reporting events including contact and resource status, and handling the events and assigning the resources according to directions received from the communications layer. The communications layer comprises software for managing communications each comprising one or more contacts in one or more media, in a media-independent manner. Managing the communications includes allocating resources that are shared by a plurality of handlers and directing handling of events by the contact layer according to business information, and also tracking and accumulating events reported by the contact layer. The communications layer illustratively uses the accumulated information to direct handling of events at the contact layer and also provides the accumulated information to the business layer. The business layer provides an interface for the business to the customer care center. The business layer comprises software for managing business services by supplying business information that defines the services to the communications layer. Illustratively, the business layer manages business services by managing transactions each comprising one or more communications and that provide the business services, by defining business rules and applying them to the transactions to develop dialogs which it supplies to the communications layer. The business rules illustratively include resource-scheduling rules, resource-behavior rules, service-target rules, and customer-treatment rules. The communications layer then translates the supplied dialogs into translations that it uses to control the contact layer and translations that it supplies to the contact layer. The handlers at the contact layer use the translations supplied thereto to manage the contacts. The business layer preferably also supplies to the communications layer definitions of reports requested by the business, and forms the reports from data collected by the communications layer. The communications layer translates the definitions of reports into database schema that accommodate data that the communications layer must collect for those reports. Through the business rules and reported information, the business layer also preferably effects scheduling and adherence tracking of resources.

The invention separates the contact media, communications, and business concerns of a customer care center (a multi-media call center) into different application layers. At the contact layer, media handlers that are tailored to specific media permit efficient use of resources for any particular medium. Relevant collected data is passed to a communication layer that abstracts and aggregates the contacts of a business's customers, regardless of medium, and that permits sharing, allocation, and tracking of resources based upon business needs, goals, and conditions as determined by the next higher level of control. The business layer specifies the operation of the customer care center by using business rules that may include allocation of resources' (e.g., agents') time to various media, determining the value of a particular customer contact, and providing or bypassing an automatic attendant application based on customer preference. Preferably, it also coordinates and tracks requests made in one medium, the status of the request (e.g., has it been fulfilled yet), and any subsequent contacts made with the customer relative to the request. The human interface resides at the business layer, where call-center operation is expressed in terms of business rules or dialog-flow diagrams. Each lower level interprets the rules/flows and configures itself with little need for human intervention. Each layer is constructed to function without the higher layers to provide basic service if the next higher level malfunctions or has no additional guidance for the lower level. This provides a foundation for reliability and scalability. The concepts of work routing, resource allocation, tracking, and data storage and reporting, are all distributed among the layers based on the function that they perform for that level. The distribution of functions and/or layers across hardware boundaries is determined by the configuration of the specific implementation.

The basic differences from the prior art are the inclusion of other communications media in the architecture in an integrated manner without relying on the voice-call base to perform functions not yet available on platforms that support those other media. The separation of control into layers allows aggregation of data from various platform types by allowing each platform to concentrate on the data that it requires in order to perform its functions while meeting a common interface to combine media contacts into a unified communication, as opposed to force-fitting other media into a voice paradigm. It further correlates a plurality of customer contacts separated in time into a single business transaction. This bridges the gap between individual contacts and allows a business to determine how best to balance the business-layer implementation with any workflow tracking application that may already be in place. Advantages provided by this architecture include the following. It provides a logical architectural foundation that satisfies architectural goals such as covering any medium, uniform handling of different media, integrating the customer care center with business data, configuring and tracking via business statements, separating "areas of concern", and providing for easier integration and for looser coupling. It maintains existing implementations and platforms to some degree, thereby avoiding the need to replace, as opposed to build upon, existing systems. It allows sharing of resources between applications. It simplifies addition of handlers to deal with new media. It allows measurement of communications across media. It allows a higher level of abstraction with respect to measurements of communications. It allows for simpler management of resources that are shared by different media. The layered model organizes care center complexity so that it is easier to deal with in implementation, maintenance, and modification. It facilitates working with business applications. It allows for hiding of information, in that each layer must deal only with data that are relevant to its functions. It allows the business to operate with constructs and concepts that are familiar to the business. It allows for aggregation and measurements of multiple contacts into a single communication. It provides flexibility. And it provides reliability because lower layers can function without higher layers.

The invention has been characterized in terms of functionality and apparatus that implements the functionality. The apparatus preferably includes an effector—any entity that effects the corresponding function, unlike a means—for each function. The invention further encompasses a computer-readable medium containing instructions which, when executed in a computer, cause the computer to effect the functionality of at least the communications and business layers.

These and other features and advantages of the invention will become more apparent from the following description of an illustrative embodiment of the invention considered together with the drawing.

DETAILED DESCRIPTION

The following terminology is adopted for purposes of describing the invention.

Contact: A medium-specific attempt to communicate. For example, a telephone call, an e-mail message, a fax, or a Web page hit. A separate contact also occurs whenever a resource is added to or removed from a connection (e.g., call transfer). May be successful or unsuccessful (e.g., an abandoned call, or a lost e-mail message).

Communication: An exchange of information that is regarded as a unit (e.g., a single business transaction) by the involved parties, regardless of the involved medium or media. May comprise one or more contacts (e.g., a customer and a call center agent talking on a telephone call while browsing and viewing the same Web pages, or a call transfer from an automated attendant to an agent).

Resource: An entity that can respond to or service a contact. For example, a call-center agent, an automated e-mail response application, a port of a voice response unit, a fax-back application, or a Web server. May be dedicated to one handler or shared by a plurality of handlers.

Handler: An entity (hardware and/or software) that manages contacts in a particular medium.

Request: The reason for a communication. For example, an order for a product, a service call, a complaint, etc.

Dialog: A business layer artifact, such as a script or a flowchart of operations, that describes on the basis of business rules the behavior of the system in response to handler requests in the context of present, historical, and predicted future conditions.

Transaction: The high-level customer-interaction model, consisting of the sets of requests and responses thereto. May involve (link) one or more communications that are used to satisfy the needs of a particular customer request.

Figure 1:
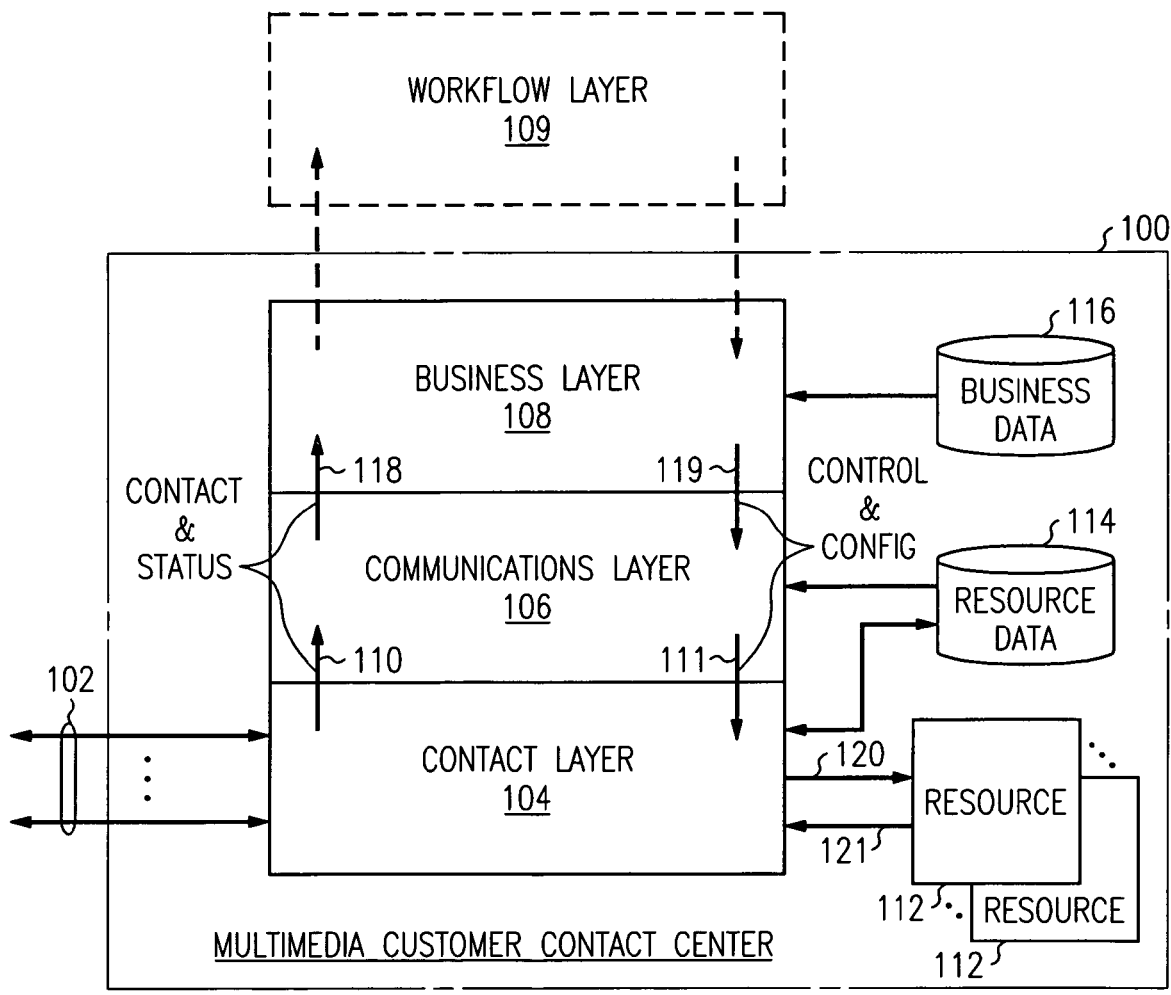
FIG. 1 is a block diagram of a multimedia customer care center that includes an illustrative embodiment of the invention.

FIG. 1 shows the configuration of a multimedia customer care center 100. Center 100 is a multimedia equivalent of, e.g., a telephone call center. Center 100 has links 102 to communications networks via which it receives and/or initiates contacts with customers. Links 102 typically include analog and/or digital telephone trunks and data network (e.g., Internet, LAN) connections. The control software and possibly also the hardware of center 100—the multimedia equivalent of, e.g., the automatic call distribution (ACD) system of a telephone call center—is partitioned into a hierarchy of three distinct layers: a contact layer 104, a communication layer 106, and a business layer 108. Status and contact information 110 and 118 flow up the hierarchy of layers 104–108 while control and configuration information 111 and 119 flow down the hierarchy of layers 104–108. Contact layer 104 interconnects contacts on links 102 with resources 112. Contact layer 104 generates resource data 114 as well as uses resource data 114 during its operation. Resource data 114 are also used by communications layer 106 for its operation. Resource data 114 contain data about resources 112, including such things as name, representation (e.g., login ID, extension, handle, IP address, etc.), state (e.g., busy, idle), and which media the resource can handle. This information is accessible from any level 104–108. Business layer 108 uses business data 116, such as customer names, account numbers, contact preferences, sales history, etc., for its operation. In addition, a workflow layer 109 may exist outside of center 100, e.g., in other computers of the business that is served by center 100, and define business workflows in support of operation of layer 108, in which case layer 108 may more properly be referred to as a transactions layer and the business layer may be viewed as encompassing both layers 108 and 109. Layers 104–108 will be discussed individually in greater detail below. The layered architecture of FIG. 1 enables features to be added to center 100 as needed without impacting all parts of center 100, unlike what would typically be the case with known architectures where all capabilities are concentrated on a single platform in tightly-integrated software. Clearly defined interfaces between layers 104–108 allow insertion of additional platforms and features into center 100.

Figure 2:
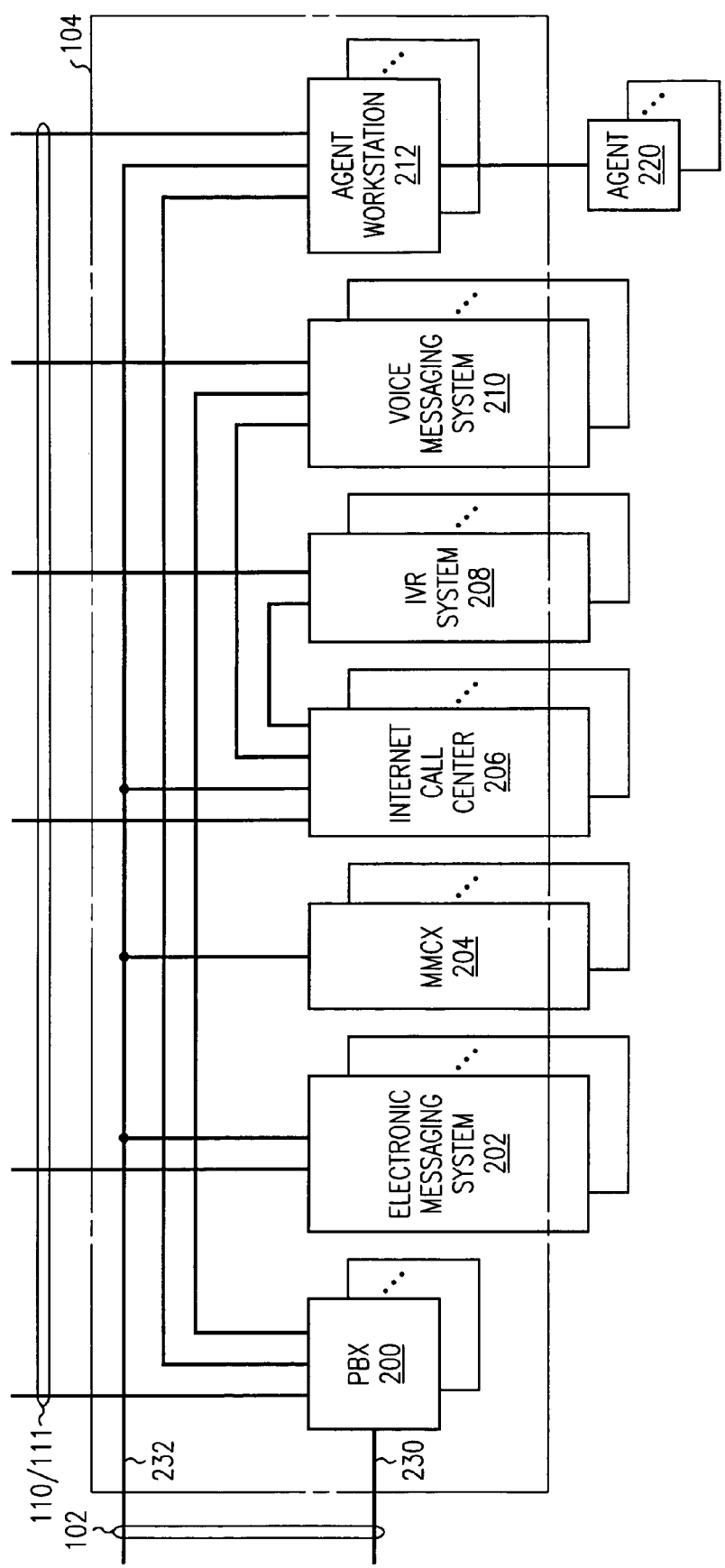
FIG. 2 is a block diagram of a contact layer of the center of FIG. 1.

FIG. 2 shows contact layer 104. Contact layer 104 manages the contact (connection, or channel of access) with the customer to connect the customer to the resource 112 that is appropriate for servicing the particular contact. Contact layer 104 comprises a plurality of handlers 200–212. Handlers 200–212 match arrivals and/or departures of contacts to resources, manage unshared resources, and collect contact information. Handlers 200–212 pass collected contact information via interface 110 to communications layer 106. They receive commands via interface 111 from layer 106 and execute them.

Handlers 200–212 may be conventional communications equipment. For example, one or more private branch exchanges (PBXs) may constitute a voice handler; one or more electronic message systems may constitute an e-mail handler; one or more Lucent Multimedia Communications Exchange (MMCX) systems may constitute a video handler and a data handler; one or more Internet-enabled call centers may constitute an Internet handler; one or more interactive voice response (IVR) systems may constitute another voice handler; one or more advanced voice messaging systems (such as the Lucent Intuity® system) may constitute a voice handler, a fax handler, and an e-mail handler; and one or more multimedia agent workstations may constitute a voice handler (e.g., a telephone set or a software-implemented telephone) and an e-mail handler. Handlers 200–212 may be interconnected in a conventional manner via links 102 that comprise telephony trunks and lines 230 and Internet and LAN connections 232. The reason that some of the conventional equipment is shown in FIG. 2 as extending outside of contact layer 104 is that the conventional equipment also constitutes resources 112 in addition to handlers 200–212. For example, resources 112 include an automated e-mail response application of the electronic messaging system, and ports of the IVR and voice messaging systems.

Contact layer 104 may include other equipment that also acts as a handler 200–212. Table A lists a few of the possible different media and possible handlers and resources therefor.

TABLE A

| Medium | Contact Type | Resources | Possible Handlers |
|---|---|---|---|
| Voice - in | Synch | Trunks, agents, queues | PBX |
| Voice - out | Synch | Trunks, agents, dialers | PBX + auto-dialer |
| Interactive Voice Response | Synch | VRU ports | Conversant® interactive voice response unit (IVRU) |
| H.320 video | Synch | Trunks, agents, queues | Definity® multimedia call handler (MMCH) or Lucent multimedia call exchange (MMCX) |
| H.323 | Synch | Trunks, agents, queues, network bandwidth | Definity® PBX + Internet Call Center (ICC) |
| Internet voice | Synch | Trunks, agents, queues, network bandwidth | Definity PBX + ICC |
| Voice chat | Synch | Chat rooms, network bandwidth | Definity PBX + ICC |
| Paper mail | Asynch | Mail carriers, scanners, agents, inboxes | PC desktop |
| E-mail/text | Asynch | Agents, inboxes, network bandwidth | PC desktop, POP3 mail server |
| Facsimile | Asynch | Trunks, agents, FAX/modem cards or dedicated FAX | PC desktop |
| Voice mail | Asynch | Agents, inboxes | PC desktop or phone, PBX, + voice messaging system (VMS) |
| Web browsing | Asynch | Web pages, network bandwidth | Web server |
| Web form submission | Either | Web pages, network bandwidth, CGI scripts, access to workflow processes | Web server + workflow system |
| Face-to-face | Synch | Agents, meeting space | PC desktop |

As Table A shows, media support two distinct types of contacts: synchronous and asynchronous. Synchronous contacts are those in which a customer maintains a connection with center 100 for an extended period of time with the expectation that his or her need will be met during that period of time. Asynchronous contacts are those in which a customer initiates a request with the expectation that a response will be made at some later time.

Handlers 200–212 provide switching and media protocol-termination functions. They establish connections between contacts and resources 112. Breaking up a communication (e.g., a call) into a number of contacts is advantageous because subsequent processing can provide detailed analyses or can take a broader view of the overall interaction. A separate contact occurs whenever a resource is added to or removed from the connection. For example, consider a voice call that enters center 100 and is sent immediately to an announcement greeting of a PBX 200 and then to an IVR 208 for collection of an account number and a determination of the service needed. The call then queues up for an available agent 220 and, after being connected and asking a question that the agent cannot answer, the call is transferred to another agent 220 who can answer it and faxes a copy of the response to the caller. This communication is composed of the following contacts:

Incoming call routes to a vector directory number (VDN) that gives a first switch announcement.

Incoming call is transferred to an IVR port for caller input.

Incoming call is transferred to an appropriate VDN that queues the call to a skill.
Incoming call is connected to a first agent.
Incoming call is conferenced with a second agent.
Incoming call is transferred to a second agent (first agent drops off.)
A fax is sent from the second agent to the caller's fax number while still connected to the caller.

Event data from each of these contacts is sent to communication layer 106 for interpretation under a common communication identifier, so that layer 106 knows that these contacts belong to the same communication.

Contact layer 104 provides relevant event data to communication layer 106 to allow for adequate tracking and management of center 100. There are two methods that are used to collect data from a process that is being monitored.

The event method, which produces a data item whenever the monitored process changes state or detects a change in the conditions to which it is to respond. This can produce a large volume of data, which requires interpretation to be meaningful. It is also the most flexible method, because new results can be obtained by redefinition of the relationship of the data events that have been collected.

The record method, which accumulates data internally to the monitored process and sends a complete, formatted data set to the reporting tools database (which may simply be a printer). This is useful when the interpretation of the data is not likely to change and where the amount of data needs to be kept to a minimum.

The rapidity with which new features and new metrics evolve makes the event method the preferred method. This is also consistent with newer object-oriented design techniques in which clients register for the events as needed. Client applications may be required to register for event delivery, or events may be broadcast and those applications that wish to receive them are required to monitor the broadcast data and capture those of relevance.

Interface 110 includes the messages from contact layer 104 to communication layer 106 that are listed in Table B.

TABLE B

| Agent logged in | Agent has logged in via the handler |
|---|---|
| Agent logged out | Agent has logged out via the handler |
| Resource maintenance busied out | The handler has busied out the resource |
| Resource maintenance busy out released | The handler has released the busy out condition |
| Information collected | SID/ANI digits, voice or text file reference, email source, Call Work-Codes entered |
| Asynchronous contact arrived | Medium type, source if known |
| Resource selected for contact | Indicates which contact has been assigned to which resource |
| Resource changed state | Agent: available, on a call, in after-call work, in aux-work state, etc. Trunk: idle, seized, on a call Mailbox: empty, space available, full |
| Contact changed state | Queued, on hold, reconnected, being served, merged with another contact, finished |
| Resource event | Stroke count, malicious call, supervisor assist, audio difficulty, vector step processed |
| Specified resource not available | No queue slots, all trunks busy, agent not logged in |
| Request resource assignment | Query from dialog implementation |
| Allocate/unallocated confirmation | Response to un/allocation messages to prevent race conditions |
| Attach new contact context | Identifies type of context |

TABLE B-continued

| Provide information-exchange result/outcome | Details of a sale or service request, credit card number, promised delivery date, etc. |
|---|---|

Interface 111 includes the messages from communication layer 106 to contact layer 104 that are listed in Table C.

TABLE C

| Agent logged in | Agent has logged in through another process |
|---|---|
| Agent logged out | Agent has logged out through another process |
| Allocate resource | Assign a resource to a handler and make the resource available to the handler for assignment to a contact |
| Unallocate resource | Resource has finished processing a contact and may become available to process another contact |
| Communication ID | Sent if not provided by new contact message |
| Specific resource list to use | Response to "Request resource assignment" message |
| Register for event | Event type or vector step to be reported |
| Set medium handler clock | Present time |
| Audit | Provides resync with current status of resources |
| Add a contact template | A contact template defined by business layer 108 is transmitted to contact layer 104 for translation into media-specific constructs |
| List of resources able to handle a contact | This may happen during evaluation of a business layer rule |

Interface 120 includes the messages from contact layer 104 to resources 112 that are listed in Table D:

TABLE D

| Set attribute value | Set value of attributes for this particular contact |
|---|---|
| Get status (e.g., estimated wait time) | Report status of this particular contact |

Interface 121 includes the messages from resources 112 to contact layer 104 that are listed in Table E.

TABLE E

| Dialog status | Response to Get Status message |
|---|---|
| Give attributes | List of all possible attributes for this contact type |
| List attributes | List of all possible attributes that a particular resource can handle |

The last two messages are for use by a configuration tool.

Figure 3:
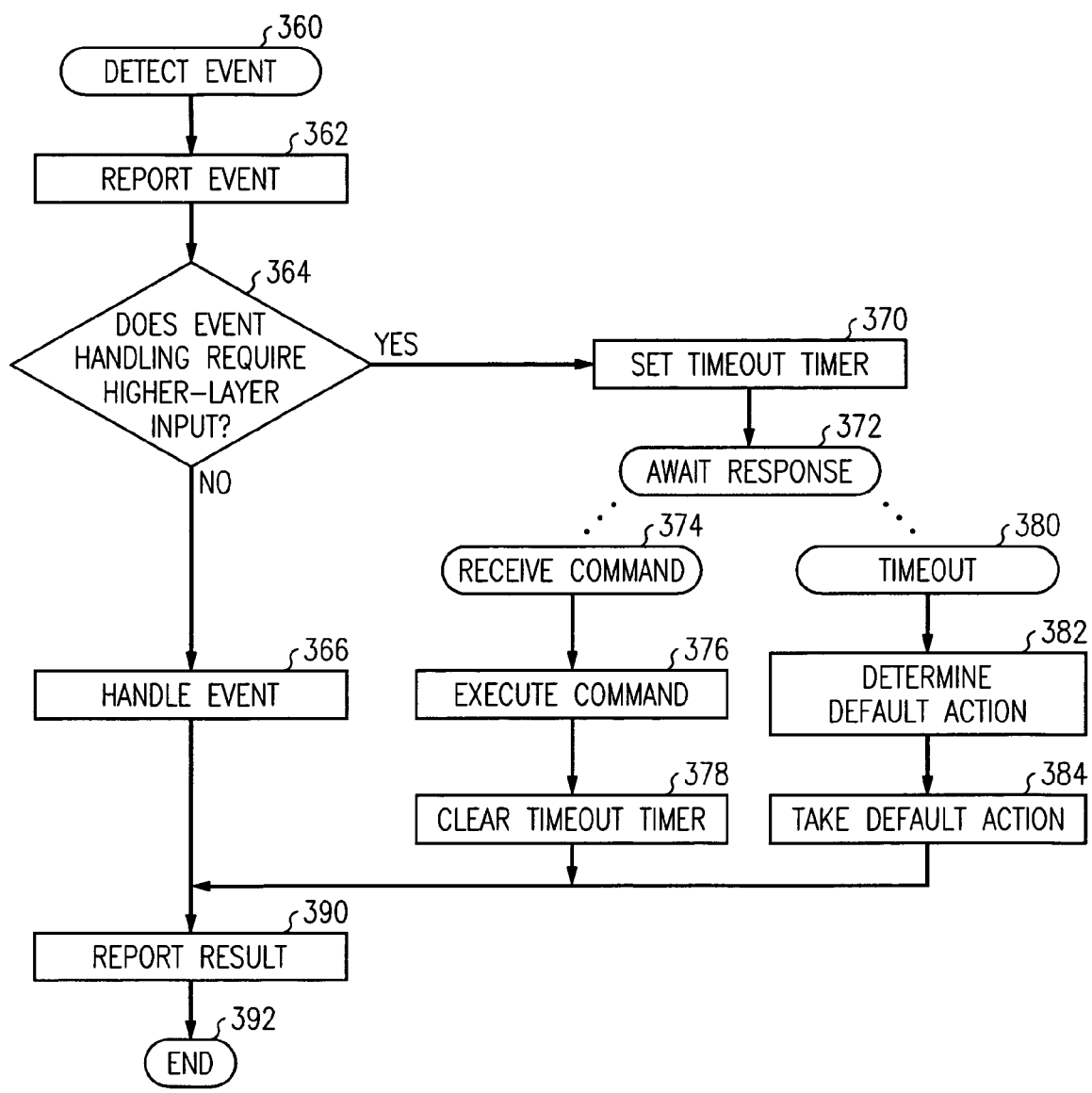
FIG. 3 is a functional flow diagram of the contact layer of FIG. 2.

The functionality of contact layer 104 is summarized and represented graphically in FIG. 3. Upon detecting an event (e.g., a new incoming contact), at step 360, a handler 200–212 reports the event to layer 106, at step 362. It then evaluates the event to determine if handling of the event requires input from higher-layers 106–108—for example, is it a new contact requiring a shared resource 112 for its handling—at step 364. If handling of the event does not require higher-layer input, handler 200–212 handles it on its own—for example, by assigning and connecting the new contact to a resource 112 that is dedicated to this handler—at step 366. Handler 200–212 then reports the result to layer 106, at step 390, and ends its response, at step 392. Returning to step 364, if it is determined there that handling of the event requires higher-layer input, handler 200–212 sets a timeout timer, at step 370, and awaits receipt of the required input, at step 372. Upon receiving a command (e.g., to connect a particular contact to a particular resource 112) from layer 106 before the timeout time expires, at step 374, handler 200–212 executes the command, at step 376, clears the timeout timer, at step 378, reports the result of the command's execution to layer 106, at step 390, and ends its response, at step 392. If, however, the timeout timer expires before receipt of input from the higher layer, at step 380, handler 200–212 determines a default action, at step 382, and takes that action, at step 384. Handler 200–212 then reports the result to layer 106, at step 390, and ends its response, at step 392.

Contact layer 104 preferably also includes rudimentary decision-making capability so that, if communications layer 106 fails, contact layer 104 can still handle contacts by connecting them to resources 112. This capability already exists in the above-mentioned conventional equipment that may constitute contact layer 104.

Figure 4:
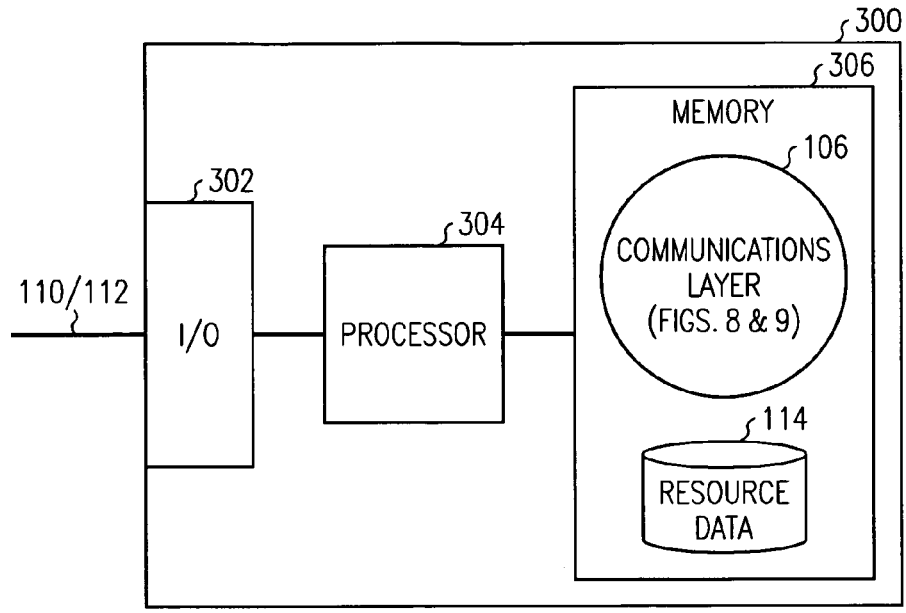
FIG. 4 is a block diagram of a computer that embodies a communications layer of the center of FIG. 1.
Figure 8:
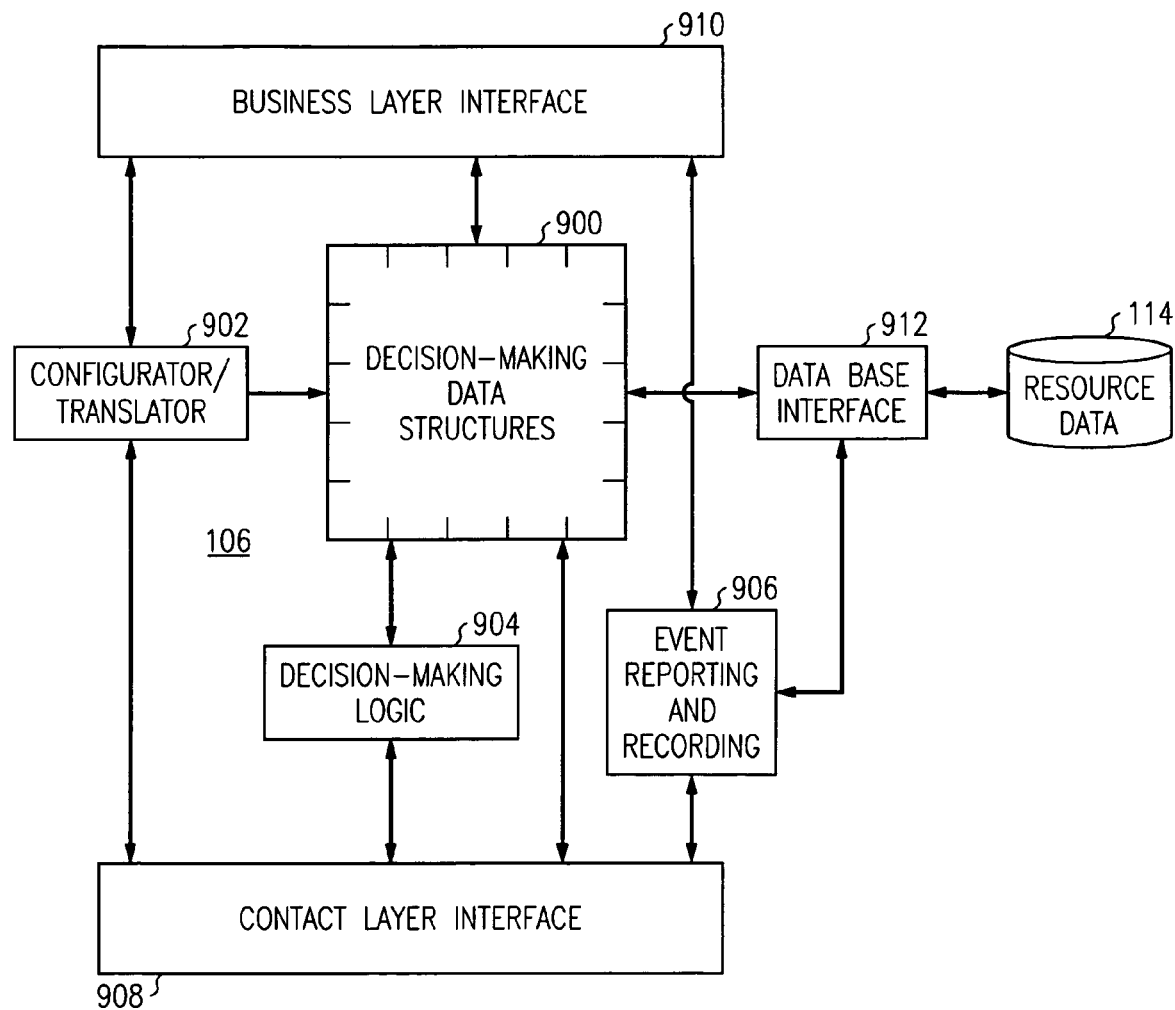
FIG. 8 is a functional block diagram of the communications layer of the center of FIG. 1.

FIG. 8 shows communications layer 106, which is illustratively implemented as a program 106 stored in a memory 306 and executed on processor 304 of a computer 300, as shown in FIG. 4. Program 106 communicates with contact layer 104 via input and output (I/O) ports 302 of computer 300. It may share memory 306 with resource status data 114. Communications layer 106 has no media-specific hardware; it is media-independent. Communications layer 106 manages shared resources, collects information about communications, provides access to information for business layer 108, and applies business rules supplied by business layer 108. Relevant data collected by handlers 200–212 of contact layer 104 are passed to layer 106, which abstracts and aggregates the contacts, regardless of medium (i.e., from different handlers 200–212), and permits sharing, allocation, and tracking of resources 112 based upon business needs, goals, and conditions determined by business layer 108. Communications layer 106 also acts as a data-aggregation point to provide accumulated or calculated data derived from events from contact layer 104 as needed to populate reports required by business layer 108.

Communications layer 106 also allocates shared resources 112 (e.g., agents 220) to handers 200–212 of contact layer 104 based upon rules established for those resources 112 by business layer 108. For example, agents 220 are shared resources in that they may be able to receive voice calls, video calls, and e-mail. These contacts are managed by different handlers 200–212, and communications layer 106 is responsible for mediating between the multiple handlers 200–212 that share use of the same agents 220. The use of agents 220 to service different media requires a new approach to their allocation and workflow balance. Because different media are handled by different handlers 200–212, the allocation of agents 220 to those different media is preferably handled by a higher layer of control. This function is performed by communications layer 106 as dictated by resource profiles supplied by business layer 108.

Figure 5:
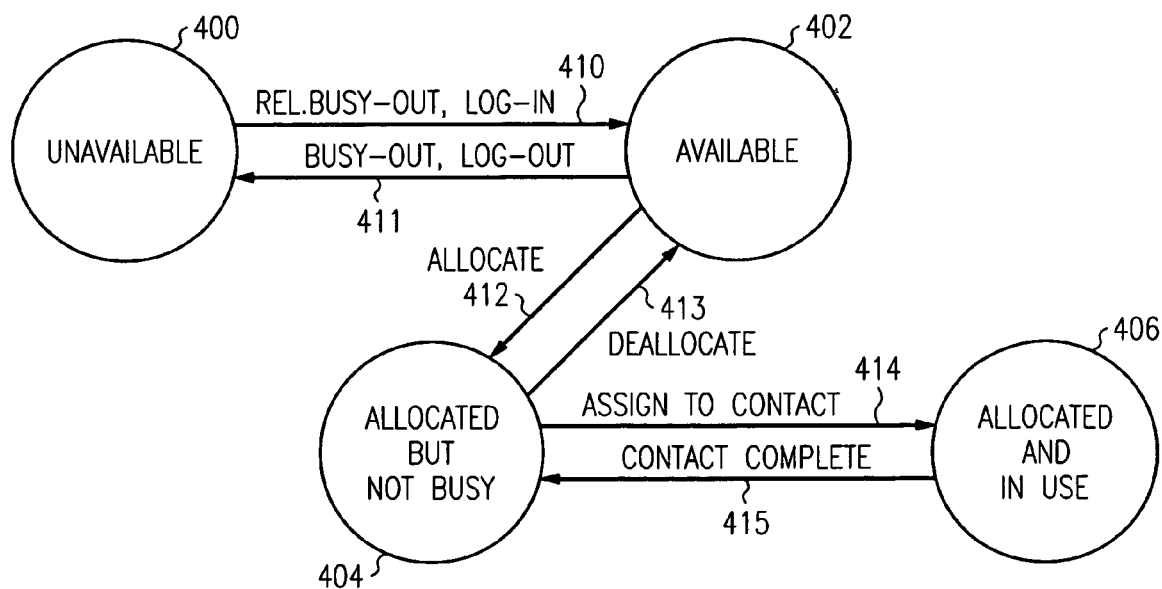
FIG. 5 is a state model of a shared resource implemented by the communications layer of FIG. 4.

A graphical representation of a state model of a shared resource 112 that is implemented by communication layer 106 is shown in FIG. 5. A shared resource 112 has four possible states for each handler to which it may be allocated: unavailable 400, available 402, allocated but not busy 404, and allocated and in use 406. A shared resource 112 is or becomes (transition 411) unavailable 400 when it is not configured, when it is busied out, or—in the case of an agent 220—when it is not logged in to a particular handler. When a shared resource 112 is configured, the busy-out condition is released, or an agent 220 logs in, shared resource 112 becomes (transition 410) available 402. Once available 402, shared resource 112 may become (transition 412) allocated 404 for use to a particular handler 200–212 yet remain not busy; it may also become (transition 413) available 402 again by being deallocated from a particular handler 200–212. When handler 200–212 assigns shared resource 112 to serve a contact, shared resource 112 becomes (transition 414) allocated and in use 406. When it completes serving the contact, shared resource 112 becomes (transition 415) allocated but not busy 404 and free to serve another contact. Allocated and in use state 406 can be further broken down into states that are used by agents 220 to indicate such conditions as, for example, after-call work (ACW) and auxiliary work (aux work). But for purposes of interaction between media handlers 200–212 at contact layer 104 and communication layer 106, this is only important in that every time a work-state changes, it is reported to communications layer 106.

In the case of a resource 112 such as an equipment port, it is unlikely to be shared, so the allocation of this unshared resource 112 for use by a handler 200–212 of the medium that the port serves may be automatic. For such a case, allocation tracking need not be done by communications layer 106. Nevertheless, a handler 200–212 may consult business layer 108 through layer 106 to determine if some specific action, such as a customized message indicating an overdue account, is appropriate for this particular contact.

In the case of an agent 220, logging in results in an event notification to communications layer 106. Layer 106 provides a centralized agent login function, and therefore an agent 220 can log in on any handler 200–212 yet produce identical results. Communications layer 106 examines the agent profile to see if agent 220 is a shared resource 112. If not, communications layer 106 simply allocates agent 220 to the appropriate medium handler 200–212 and pays no further attention to that aspect of its control unless the agent's profile is changed through business layer 108. If agent 220 is a shared resource 112, the present conditions existing on all applicable media handlers 200–212 are examined to determine what the best possible use for this agent 220 is. Communications layer 106 notifies all media handlers 200–212 that agent 220 is logged in, but allocates it as a shared resource 112 to one or more handlers 200–212, as determined by business rules. Agent 220 might not be allocated to multiple handlers 200–212 simultaneously, because delays in conditions between handlers 200–212 could result in race conditions where agent 220 could be assigned to two contacts at the same time. Such race conditions might be acceptable, such as allowing an incoming e-mail to be delivered to an agent who is serving a voice call. Once an agent 220 is available and allocated to a handler 200–212, agent 220 selection is based on how business layer 108 rules have been implemented for that specific handler 200–212. If resource 112 selection is made simply on a most-idle basis, contact layer 104 maintains that status information. If prior communication events or business considerations are used in making the selection of a resource 112, upper layers 106–108 need to be consulted. Messaging 110 supports a query to upper layers 106–108 that results in a return 111 of one or a list of acceptable resources 112. This could, for example, direct the contact to a favorite agent 220, or could bypass VRU prompting if past history indicates that the same script path is always chosen, or a query from the VRU handler could produce custom script choices that only provide options for which the caller is subscribed. Continued monitoring of conditions results in allocation and deallocation of agents 220 to and from handlers 200–212 as needed. Deallocation of agent 220 from a handler 200–212 does not take effect until the presently served contact is completed, and must be confirmed before allocation of that agent 220 to a different handler 200–212.

Figure 6:
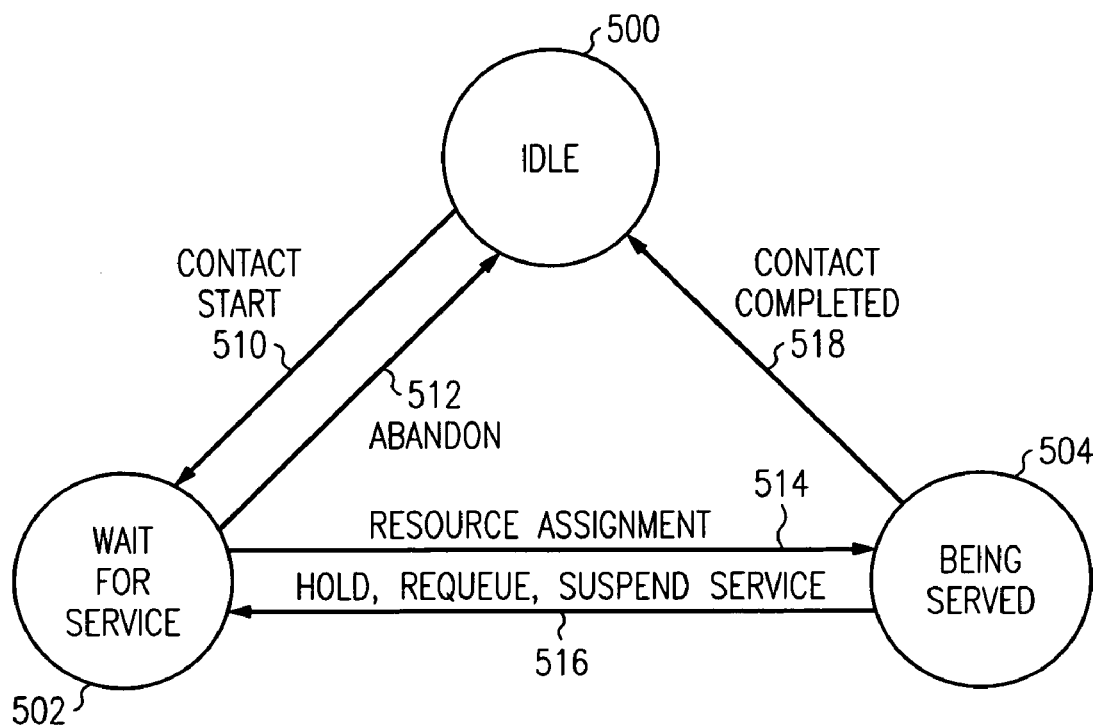
FIG. 6 is a state model of a synchronous contact implemented by the communications layer of FIG. 4.
Figure 7:
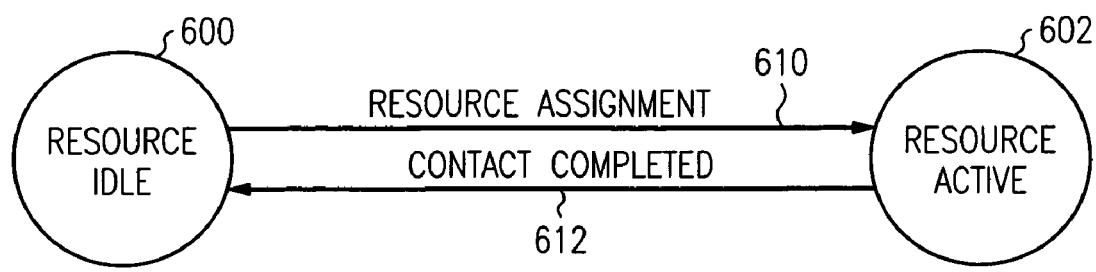
FIG. 7 is a state model of an asynchronous contact implemented by the communications layer of FIG. 4.

As was mentioned previously, contacts fall into two types: synchronous and asynchronous. A graphical representation of a state model of each contact type as implemented by communications layer 106 is shown respectively in FIGS. 6 and 7.

The start of a synchronous contact occurs with the detection of arrival of an incoming contact (e.g., call, chat, etc.), a request by communications layer 106 to initiate an outgoing communication, or by the medium handler's implementation of a business layer dialog as it transitions from one resource to another. This causes a transition 510 in FIG. 6 of the contact from an idle state 500 to a wait-for-service state 502. Given limited resources, there will be some wait until an acceptable resource 112 becomes available, at which time that resource 112 will be assigned to the contact. This causes a transition 514 of the contact from wait state 502 to being-served state 504. Resource 112 can suspend service (e.g., "hold" in the voice-call model) or can re-queue the contact as an error-recovery technique. This causes a transition 516 from being-served state 504 back to wait state 502. When the other party disconnects, the contact is either abandoned or completed. This causes a transition 518 from being-served state 504 or a transition 512 from wait state 502 back to idle state 500. Far-end disconnect rather than the agent disconnect is normally used as the trigger for transitions 512 and 518, because many call center procedures require agents 220 to maintain the connection and wish to be notified if the agent disconnects before the caller.

While a synchronous contact requires a wait state 502 and a being-served state 504, with an asynchronous contact the perceived wait-times are a function of the application-response or transmission-response time and not the need to wait for a resource 112 to become available. The start of an asynchronous contact occurs with the assignment of a resource 112 to the contact. This causes a transition 610 in FIG. 7 of the contact from a resource idle state 600 to a resource active state 602. Completion of the contact causes a transition 612 from resource active state 602 back to resource idle state 600. There is no wait-for-service state, because asynchronous contacts rely on resources 112 being available or service is not provided at all. For example, e-mail arrives as a file transfer and is either stored in an available incoming mailbox or the sender will re-try later. Attempts to read a Web page by a browser result in either a file transfer back to the browser or the browser times out and gives an error message. It is up to the user to re-try access to the Web page. A fax call is served or encounters a busy condition that initiates a re-try sequence a few minutes later. In these cases, the completion of the contact is the relevant event and, if detectable, an out-of-resources message indicates that an attempt was made but not served.

In the case of e-mail as an example, a message may sit in an inbox for a period of time before it is looked at for subsequent assignment to an agent 220 for response. It is the implementation of a business level 108 dialog in communications layer 106 that decides when this message has been served to the satisfaction of the business, and it must use the appropriate related event to indicate communication completion. This may be, for example, when the assigned agent 220 sends an e-mail reply back to the request originator. Or it may be when a fax has been sent in response to the e-mail request. The response may come from a completely different media handler 200–212.

FIG. 8 shows the internal structure of communications layer 106. Layer 106 includes data structures 900 that store decision-making data. The data are structured in whatever manner is convenient for decision-making, for example, as tables, databases, logic statements, etc. Structure information defining the schema or templates of the data is communicated to layer 106 by business layer 108 via a business layer interface 910 that communicates with business layer 108 on behalf of communications layer 106. Data structures 900 are administered by a configurator/translator 902, which populates data structures 900 with data. Configurator/translator 902 receives data from business layer 108 via business layer interface 910. Other data in data structures 900 are supplied by contact layer 104 via contact layer interface 908. Configurator/translator 902 also sets up vectors, scripts, agent groups, resource allocations, and other lower-level translations which it communicates to contact layer 104 through contact layer interface 908. Decision-making data from data structures 900 are obtained, and may also be generated in part, by decision-making software 904 which implements the intelligence of communications layer 106. Decision-making software 904 receives requests from, and communicates its decisions to, contact layer 104 via contact layer interface 908. Event reporting and recording 906 receives events from contact layer 104 via contact layer interface 908 and records them, via a database interface 912, in resource database 114 whose schema are defined by business layer 108. Event reporting and recording 906 also receives requests for reports from business layer 108, formulates the reports from data that it requests and obtains from database 114 via database interface 912, and sends the reports back to business layer 108 via business layer interface 910. Data may also be communicated between data structures 900 and database 114 via database interface 912.

Figure 9A:
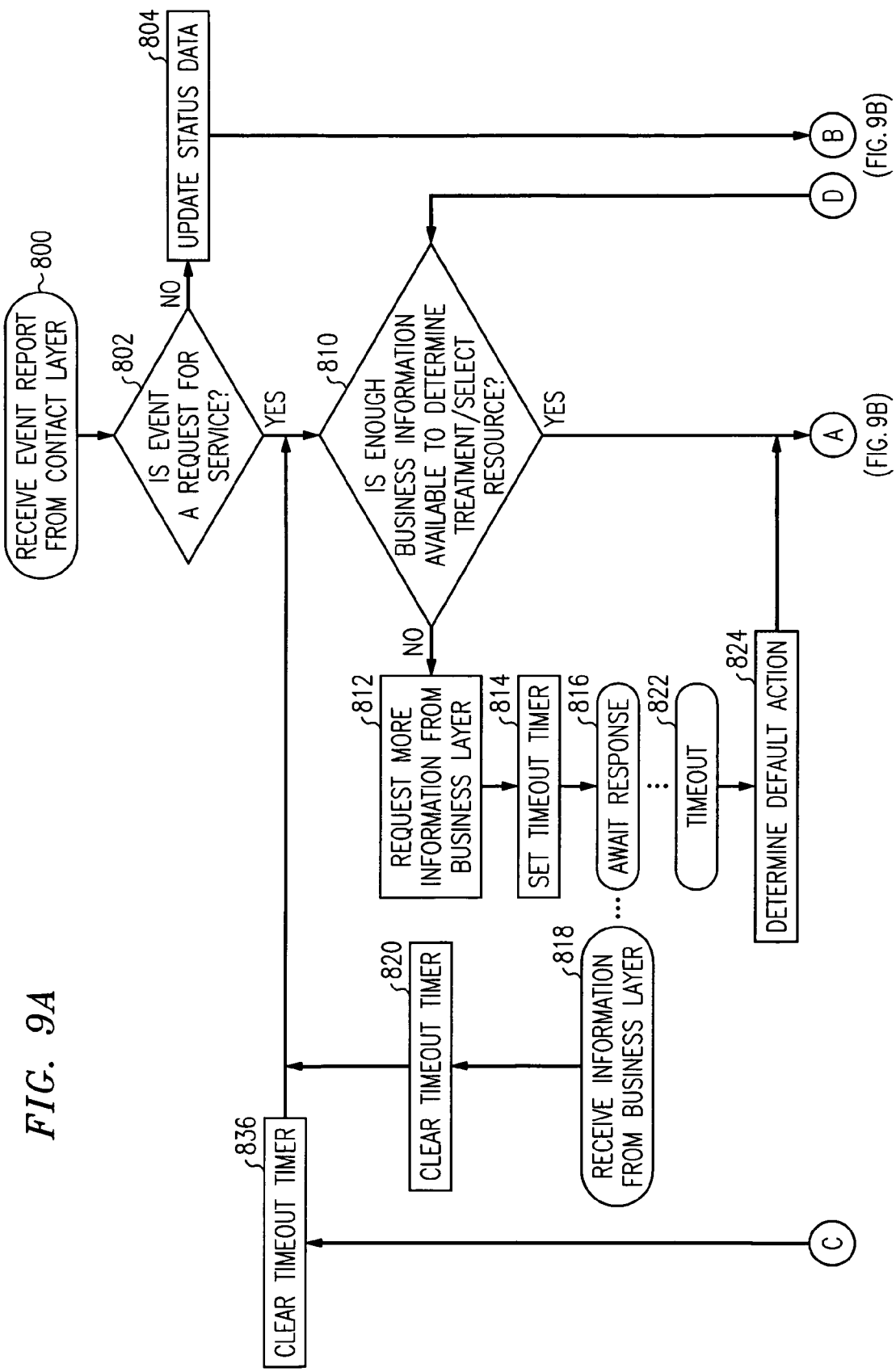
FIG. 9 is a functional flow diagram of the communications layer of FIG. 8.
Figure 9B:
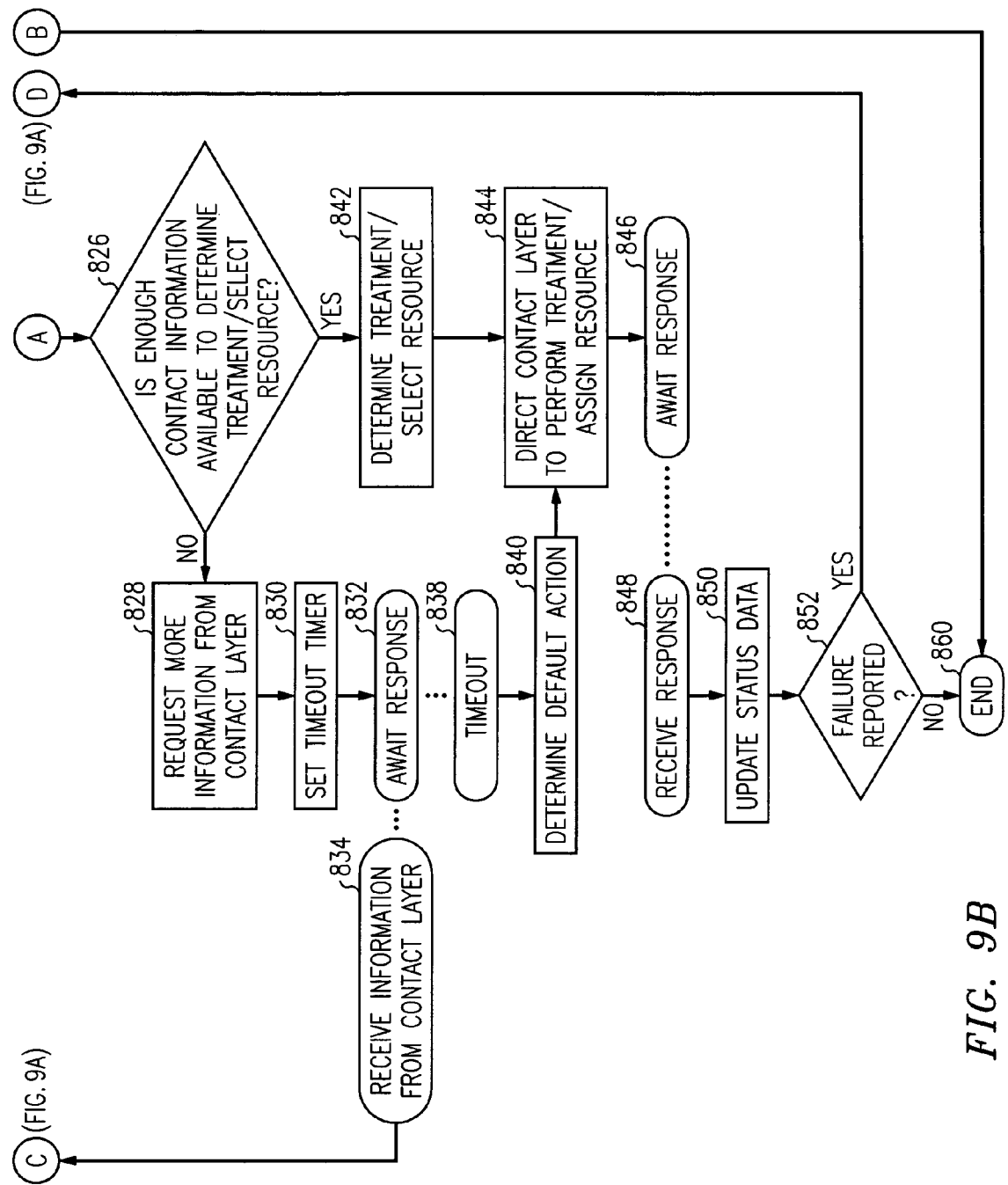

The functionality of communications layer 106 with respect to contact layer 104 is summarized and represented in FIG. 9. Upon receiving an event notification from contact layer 104, at step 800, communications layer 106 examines the report to determine if it is a status change (e.g., a contact or a resource state change) or a request for service (e.g., detection of a new contact that requires higher-layer input for handling), at step 802. If the reported event is a status change, layer 106 updates its decision-making data 900 (e.g., a "call record" in the case of a contact state change, or resource data 114 in the case of a resource 112 state change), at step 804, and ends its handling of the event, at step 860. If the reported event is determined at step 802 to be a request for service, layer 106 applies the information supplied by the request to its decision-making logic 904 (e.g., compares it against tables of business rules and customer information) to determine if it has enough business information to service the contact, i.e., to determine a treatment and to select a resource 112 for the contact, at step 810. For example, it determines whether or not it needs information about prior contacts of the customer in order to resolve applicable business rules. If it determines that it does not have enough business information, layer 106 requests the needed information from business layer 108, at step 812, sets a timeout timer, at step 814, and awaits receipt of the requested information, at step 816. If it receives the requested information, at step 818, before the timeout timer times out, layer 106 clears the timeout timer, at step 820, and then returns to step 810. If it does not receive the requested information before the timeout timer times out, at step 822, layer 106 determines a default action to take, at step 824. If and when layer 106 determines at step 810 that it has enough business information, it applies the information supplied by the request for service that was received from layer 104 to its decision-making logic 904 (e.g., compares the information against tables of status information, business rules, and customer information) to determine if it has enough contact information to service the contact, at step 826. Similarly, following step 824, layer 106 applies the information that it has on the default action to decision-making logic 904, to determine if it has enough contact information to service the contact, at step 826. If layer 106 determines at step 826 that it does not have enough information from contact layer 104 to determine a treatment/select a resource for the contact, it commands contact layer 104 to collect more of the needed information, at step 828, sets a timeout timer, at step 830, and awaits receipt of the requested information, at step 832. If it receives the requested information, at step 834, before the timeout timer times out, layer 106 clears the timeout timer, at step 836, and then returns to step 810. The additional information received from contact layer 104 may require a new decision in step 810; however, the logic in steps 810 and 826 is designed to prevent non-ending re-analysis. If it does not receive the requested information before the timeout timer times out, at step 838, layer 106 determines a default action to take, at step 840. The mechanisms for making the determinations at steps 810 and 826 are illustratively conventional, such as an adaptation of those described for telephony applications in U.S. Pat. Nos. 5,311,584 and 5,721,770. If and when layer 106 determines at step 826 that it does have enough contact information, it uses the information to determine a treatment/select a resource 112 for the contact, at step 842. Layer 106 again accomplishes this in a conventional manner, illustratively as described in the above-mentioned patents. Having determined a treatment/selected a resource at step 842 or having determined a default action at step 840, layer 106 commands contact layer 104 to assign the selected resource 112 to the contact and give the contact the determined treatment or undertake the default action, at step 844. Layer 106 then awaits receipt of a response to its command from contact layer 104, at step 846. Upon receiving the response, at step 848, layer 106 updates its status data accordingly, at step 850. If a failure was reported, as determined at step 852, layer 106 returns to step 810; if a success was reported, layer 106 ends its handling of the service request, at step 860.

The discussion up to this point has assumed a single-site center 100. But the architecture is independent of the number of locations included in center 100. There are three approaches to multi-site implementation:

All contacts arrive at a single site and are distributed by the entry platform at contact layer 104.

All contacts arrive at a site external to the contact layer 104 platforms and are delivered as determined by communications between that external site and system 100 (e.g., queuing in the network).

A combination of the above.

In the multi-site configuration, business layer 108 and communication layer 106 can be localized to control only their site's media handlers 212–220. Alternatively, a single instance (single location or distributed) of business layer 108 and communication layer 106 can control all media handlers 200–212 at all sites.

Figure 10:
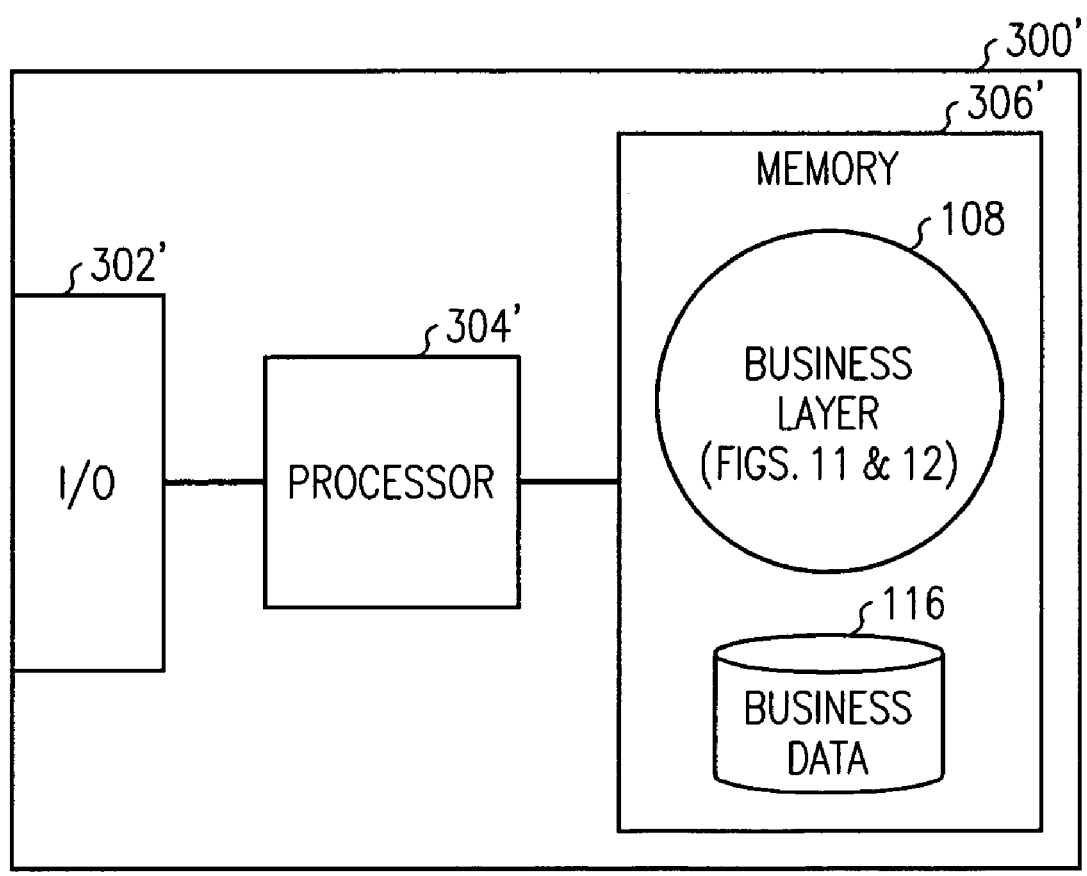
FIG. 10 is a block diagram of a computer that embodies a business layer of the center of FIG. 1.
Figure 11:
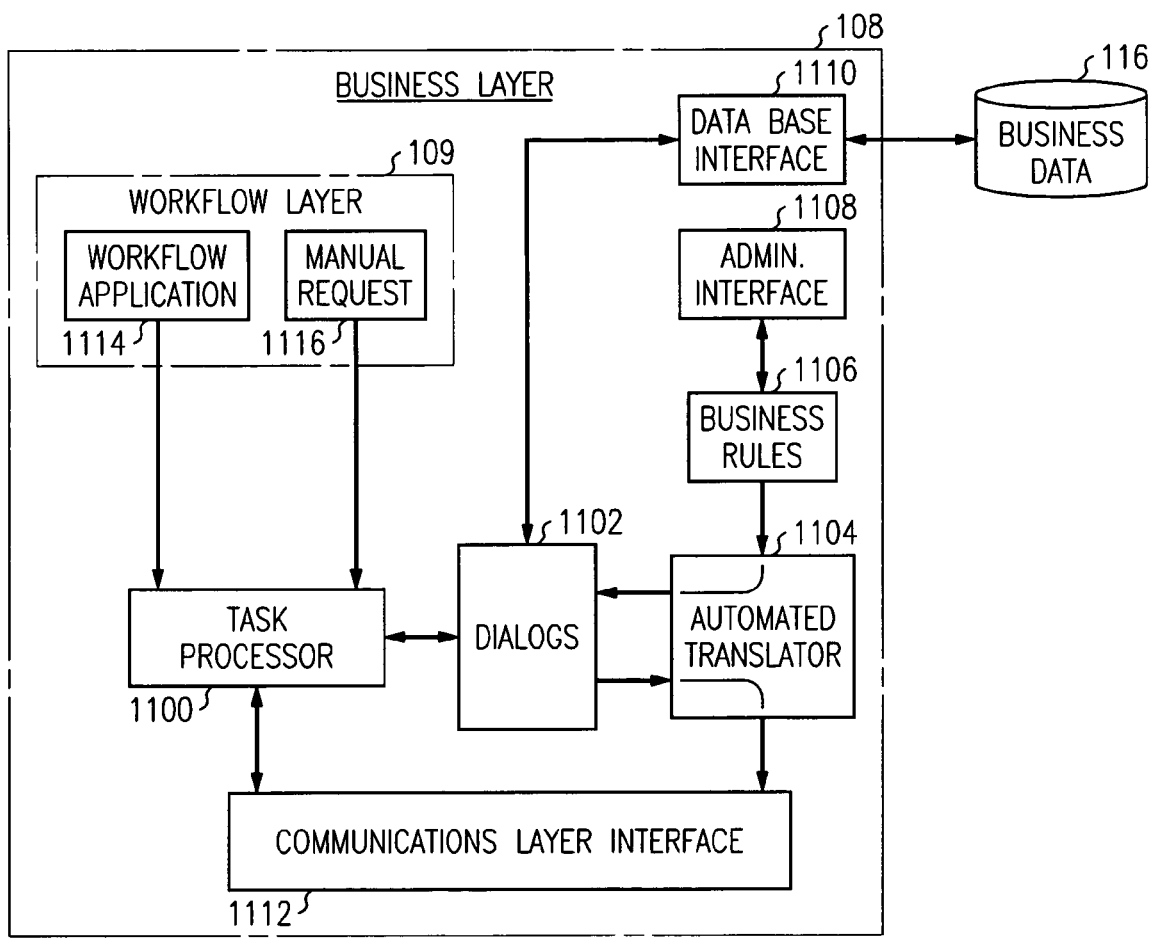
FIG. 11 is a functional block diagram of the business layer of the center of FIG. 1.

FIG. 11 shows business layer 108, which is illustratively also implemented as a program 108 stored in memory 306' and executed on processor 304' of a computer 300', as shown in FIG. 10. Computer 300' of FIG. 10 and computer 300 of FIG. 4 may be the same computer or different computers. If they are different computers, program 108 communicates with communication layer 106 via I/O ports 302' of computer 300'. Program 108 may share memory 306' with business data 116. Business layer 108 defines business services via dialogs, manages workflow, sets business policies and rules, manages customer characteristics, determines customer value, and manages resource effectiveness. Its roles include those that are commonly performed by computer-telephony integration (CTI) in telephone call centers.

Business layer 108 provides the human planning interface to center 100 for the business. It defines business services, including the types of business requests that it accepts, the information that it needs to service the requests, and the business transactions that provide the requested service. It defines the meaning of communications, and how the business interacts with customers on a per-medium basis. It sets business policies, including agent schedules, service targets, agent behavior (e.g., scripts), call treatment, etc. It keeps information about customers, their characteristics, and their value to the business. It evaluates business effectiveness. And it provides workflow management. It establishes the center workflow by describing dialogs that are translated by communications layer 106 into discreet translations required for the operation of handlers 200–212 in contact layer 104. Business transactions that are initiated as a result of a communication with a customer feed into a workflow defined by business layer 108. The workflow may initiate outbound communications in center 100 by starting an outbound dialog that defines the workflow for that particular request. Definitions of reports that are needed to manage center 100 are provided by business layer 108, and at lower layers 104–106 translate into database schema to accommodate the data that must be collected to provide those reports. Scheduling and adherence tracking of resources 112 that are available at contact layer 104 are managed by business layer 108, as are business data 116. Business layer 108 also defines structure for transactions, which may involve multiple communications. Transactions link all communications that are needed to satisfy a particular customer request and could include, for example, a follow-up communication at a later time.

Business data 116 can comprise external information systems of any kind, e.g., workflow applications and external databases. However, it is required that business layer 108 software components be independent of these systems and immune to changes in those systems, e.g., business layer 108 software need not be recompiled or re-deployed every time that it is integrated with a new external information system or when an external information system is modified. This requires the use of technologies that allow late bindings/dynamic linking, such as COM or CORBA, to implement business layer 108. These technologies allow integration with external information systems via wrappers that provide interfaces that are compliant with either of these technologies. Conventions for a set of meta-level or self-describing interfaces that allow for the run-time description of the external system are also desirable.

Business layer 108 can be functionally divided into three components: configuration and administration, decision-making, and monitoring and reporting.

Configuration tools allow designers of system 100 to adapt or customize system 100 according to the business needs. The designers use the configuration tools to manipulate the definitions of external information systems and internal entities in order to describe the behavior of system 100. The definitions of the external information systems are exposed to the configuration tool through the interfaces offered by the above-mentioned wrappers.

Describing the behavior of business layer 108 consists of:

Defining resource profiles

Defining dialog templates

Mapping dialogs to communications and media-specific contacts

Defining logic for decision points, where decision points describe which course the dialog will take and which resource is allocated to a specific contact.

Once the configuration is defined, it must be implemented. Part of the implementation is translating some of the high-level constructs into lower-layer 104–106 constructs. This may be performed by automated translators. Those translators use configuration interfaces exposed by lower layers 104–106. The other part of the implementation of the configuration is done at business layer 108 itself. It is implemented by the decision-making component. This component executes the directives described in the dialog templates provided by the configuration tool, by collecting information from external information systems and from other entities (e.g., previous exchanges of information, resources states, etc.). The decision-making tool is informed of the activities of lower layers 104–106 through notifications interface 118 that it offers to those layers.

The reporting and tracing tool has two functions:

To keep a trace of all activities in system 100 for future reference.

To provide real-time and historic reports and monitors for people and/or automated controllers about the activities of system 100.

The traces are based on schema derived from the configuration of system 100. The traces offer external interfaces so that their information can be combined with external information to make reports and monitors meaningful to the business. The monitors and the reports are configurable or customizable by their users to contain the information coming from the traces, the real-time operations (states of current entities) and external information systems. The reporting and tracing component offers a notification interface 118 with the decision-making tool. It is through this notification interface 118 that information is collected from lower layers 104–106 and from the decision-making tool about their activities.

Operation of system 100 can be viewed as an automated system for processing work requests as initiated by the business workflow or by customers via any medium. Consequently, this system may use existing and future workflow standards for software terminology, interoperability, and connectivity between workflow products.

Interface 119 includes the messages from business layer 108 to communications layer 106 that are listed in Table F.

TABLE F

| Start a communication | COMM ID, Media type, Message data (specific agent or message to connect, agent group, e-mail text, video clip . . . ) |
| --- | --- |
| Request an active communication status | COMM ID |
| Request a resource status | Resource type (single agent, voice port, agent group, media server, etc.) |
| Request communication history | COMM ID, list of history data needed |

TABLE F-continued

| Configuration setup message(s) Schema descriptions Population of schema based on business rules | Conditions and data to build database schema in communications layer for decision-making and for communicating event data history records |
| --- | --- |
| Response to request for information from communications layer | Information requested, COMM ID, (could be null) |

System 100 is fed by a workflow system which could be automated (independent of or integrated with business layer 108) or manual (based on business practices established by the human managers of the business and perhaps just defined in paper documents). Also, incoming communications and their handling by a resource (e.g., agent) can trigger a workflow appropriate for that communication. Interface 118 includes the messages from communications layer 106 to business layer 108 that are listed in Table G.

TABLE G

| Communication success | COMM ID, response data (null, purchase, follow-up needed, . . . ) |
| --- | --- |
| Communication failure | COMM ID, type of failure (busy, no answer, requested resource not available, call denied, . . . ) |
| Status report | Response to request on active communication or resource |
| Communication status notification | COMM ID, communication start, stop, resources involved, exception notification |
| Communication history response | Response to request for history |
| Request for call handling information | Data describing type of information needed |

Integration of configuration tools with external workflow configuration tools is highly desirable. The user interface of the configuration tools is preferably a plug-in component (e.g., JavaBean or ActiveX component). The business rules are also self-describing components that can be modified and inspected through their interfaces.

Interfaces between business layer 108 and external databases include:

Interfaces for extracting information useful for decision-making (extracted automatically by discovery tools).

Queries concerning dialogs. These queries are determined by the data model used for the dialogs. They may involve known techniques such as SQL or data mining.

Interfaces describing the data model of the dialog (self-describing, or meta interfaces).

FIG. 11 shows the internal structure of business layer 108. A task processor 1100 executes requests received from communications layer 106 via a communications layer interface 1112, from workflow application 1114, or via manual input of requests 1116. As was mentioned previously, workflow application 1114 and manual requests 1116 may either be included in business layer 108 or may be implemented externally as a separate workflow layer 109. Task processor 1100 uses dialogs 1102 to make decisions, and communicates the results of those decisions to communications layer 106 via interface 1112. Dialogs 1102 embody data logic needed for decision-making. Illustrative examples of steps in a dialog 1102 are given in Table H.

TABLE H

| | |
|---|---|
| If customer value = High Value Customer, | send to preferred agent |
| If customer wait < 40 seconds, | send to preferred pool |
| If customer wait > 40 seconds, | send to any agent |
| If customer last contact < 2 days, | send to previous agent |
| If customer wait >60 seconds for skill 7, | add agent to skill 7 |
| If customer wait <5 seconds for skill 7, | remove agent from skill 7 |
| If customer overdue > 10 days, | make e-mail dunning notice |
| If customer overdue > 20 days, | make voice skill 12 |
| If customer unknown, | send to VRU GETACCTNO |

Dialogs 1102 may illustratively be structures like decision-making data structures 900 of communications layer 106 (See FIG. 8). Dialogs 1102 employ business data 116, which they access via database interface 1110, and stored business rules 1106 that have been specified via an administration interface 1108. Business rules 1106 are high-level constructs that specify how system 100 is to behave in order to further the objectives of the business. Illustrative examples of business rules 1106 are given in Table I.

TABLE I

1. Platinum customers get preferential treatment
2. Low-cost maintenance contract subscribers get low priority treatment
3. Sales calls get preference over help calls
4. Premium service contract users get preference over sales calls
5. Voice calls can be delivered to human agents handling e-mail Dialogs 1102 are created through business rules 1106 through an automated translator 1104 that converts a restricted, structured human-language business rule into a series of logical statements that define steps to be taken under specified conditions. Dialogs 1102 further determine what decision-making data and structures are needed at communications layer 106, and communicate this information to layer 106 via automated translator 1104 and communications layer interface 1112. This information allows layer 106 to configure itself accordingly, and also indicates to layer 106 when it must contact business layer 108 for decisions.

Figure 12:
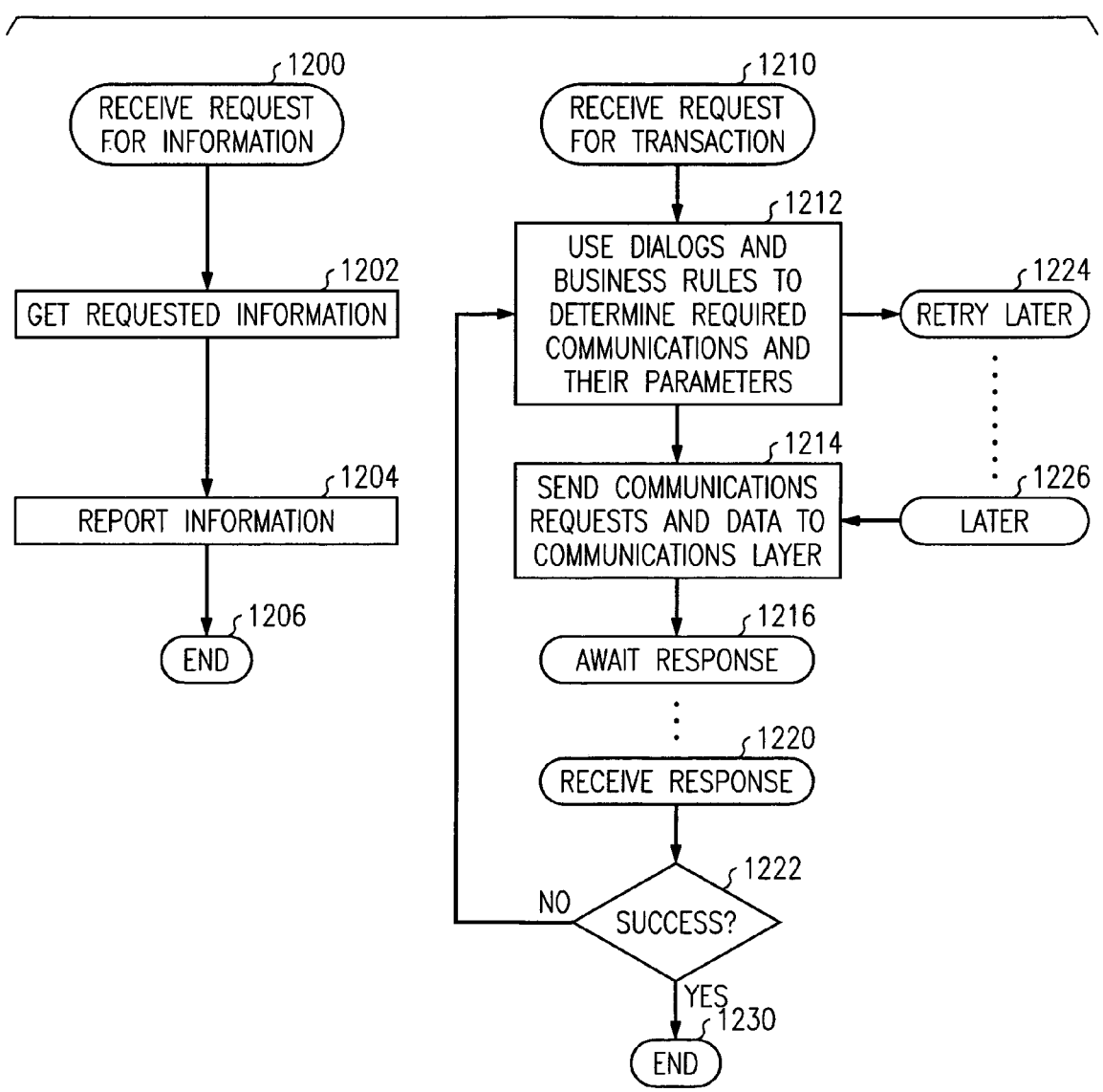
FIG. 12 is a functional flow diagram of the business layer of FIG. 11.

The functionality of business layer 108 is summarized and represented in FIG. 12. As was mentioned previously, business layer 108 processes received requests. If it receives a request for information, at step 1200—typically from communications layer 106—business layer 108 gets the requested information, e.g., from business database 116, at step 1202, reports the information to the requester, at step 1204, and ends processing of the request, at step 1206. If it receives a request for a transaction, at step 1210—from workflow application 1114 or manual request 1116—business layer 108 uses dialogs derived from business rules 1106 to determine the communications and their parameters that are needed to effect the requested transaction, at step 1212. Business layer 108 then sends requests for those communications along with corresponding data to communications layer 106, at step 1214, and awaits a response, at step 1216. When communications layer 106 returns a response, at step 1220, business layer 108 checks it to determine if the requested communications succeeded, at step 1222. If so, business layer 108 ends its processing of the request, at step 1230. If the communications did not succeed, business layer 108 returns to step 1212 to determine what to do next. It may be determined at step 1212 that the communications should be retried later, in which case business layer 108 schedules them to be retried at a later time, at step 1224, and when that time arrives, at step 1226, it proceeds to steps 1214 et seq.

Of course, various changes and modifications to the illustrative embodiment described above will be apparent to those skilled in the art. For example, the defined layers may be separated into additional layers to take advantage of commonality between subsets of media. Or, configuration of data in the layers may be done manually at first, to allow phased development of automatic translations. Also, interfaces may be added to existing products to enable their support of this architectural model. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A customer care center comprising:

a contact layer comprising equipment defining plurality of media-specific handlers for managing contacts in a plurality of communications media with customers of a business served by the customer care center, each handler adapted to handle a specific one or more of the media, and including connecting the contacts to resources for servicing, collecting and reporting events including contact and resource status, handling the events and assigning the resources according to directions received from a communications layer;

the communications layer comprising a processor executing software for managing communications each comprising one or more contacts in one or more media in a media-independent manner according to directions received from a business layer, including allocating resources shared by a plurality of handlers and directing handling of events by the contact layer by applying data from the contact and business layers to decision-making logic derived from dialogs, wherein a dialog describes behavior of the customer care center responsive to the events in a context of at least one of present, historical, and predicted future conditions, and conveying decisions of the decision-making logic to the contact layer, tracking and accumulating events reported by the contact layer, and providing event data to the business layer; and the business layer comprising an interface for defining behavior of the business layer and further comprising a processor executing behavior-implementing software for managing business services by supplying business information that defines the services to the communications layer, including defining workflows of the services, each comprising one or more communications, via the dialogs which are derived by the business layer from business rules, which define schema of the decision-making logic, and which use business data and data from the communications layer to determine the communications and parameters of the communications for the communications layer, wherein:

the business layer software manages business services by managing transactions each comprising one or more communications and that provide the business services, by defining the business rules and applying them to the transactions to develop the dialogs which it supplies to the communications layer;

the communications layer software translates the supplied dialogs into translations that it uses to control the contact layer and translations that it supplies to the contact layer; and the handlers of the contact layer use the translations supplied thereto to manage the contacts.

2. The customer care center of claim 1 wherein:
the contact layer manages resources that are not shared by a plurality of handlers.

3. The customer care center of claim 2 wherein:
each handler manages the unshared resources that are allocated to that handler.

4. The customer care center of claim 1 wherein:
the communications layer comprises no media-specific equipment.

5. The customer care center claim 1 wherein:
the communications layer software further directs handling of events according to the accumulated reported events.

6. The customer care center of claim 1 wherein:
the communications layer software provides information on the accumulated reported events to the business layer.

7. The customer care center of claim 1 wherein:
the business layer software supplies to the communications layer definitions of reports requested by the business and forms the reports from data collected by the communications layer; and
the communications layer software translates the definitions of the reports into database schema that accommodate data that the communications layer must collect for those reports.

8. The customer care center of claim 1 wherein:
the business rules include resource scheduling rules, resource behavior rules, service target rules, and customer treatment rules.

9. The customer care center of claim 1 wherein:
the business layer software further has access to customer data which it applies to the transactions to develop the dialogs.

10. The customer care center of claim 1 wherein:
the business layer software effects scheduling and adherence tracking of resources by providing business information to the communications layer and obtaining accumulated reported events from the communications layer.

11. The customer care center of claim 1 wherein:
the business layer provides an interface for the business to the customer care center for providing information to and obtaining information from the customer care center.

12. A computer-readable medium containing instructions which, when executed in a computer that is connected to a contact layer of a customer care center comprising equipment defining a plurality of media-specific handlers for managing contacts in a plurality of communications media with customers of a business served by the customer care center, each handler adapted to handle a specific one or more of the media, and including connecting the contacts to resources for servicing, collecting and reporting events including contact and resource status, and handling the events and assigning the resources according to directions received from a communications layer, cause the computer:
to implement the communications layer for managing communications each comprising one or more contacts in one or more media in a media-independent manner according to directions received from a business layer, including allocating resources shared by a plurality of handlers and directing handling of events by the contact layer by applying data from the contact and business layers to decision-making logic derived from dialogs, wherein a dialog describes behavior of the customer care center responsive to the events in a context of at least one of present, historical, and predicted future conditions, and conveying decisions of the decision-making logic to the contact layer, tracking and accumulating events reported by the contact layer, and providing event data to the business layer, and
to implement the business layer for managing business services by supplying business information that defines the services to the communications layer, including defining workflows of the services, each comprising one or more communications, via the dialogs which are derived by the business layer from business rules, which define schema of the decision-making logic, and which use business data and data from the communications layer to determine the communications and parameters of the communications for the communications layer, and to implement an interface for defining behavior of the business layer, wherein
the business layer software manages business services by managing transactions each comprising one or more communications and that provide the business services, by defining the business rules and applying them to the transactions to develop the dialogs which it supplies to the communications layer;
the communications layer software translates the supplied dialogs into translations that it uses to control the contact layer and translations that it supplies to the contact layer; and
the handlers of the contact layer use the translations supplied thereto to manage the contacts.

13. The medium of claim 12 wherein:
the contact layer includes computer instructions that manage resources that are not shared by a plurality of handlers.

14. The medium of claim 13 wherein:
each handler manages the unshared resources that are allocated to that handler.

15. The medium of claim 12 wherein:
the communications layer comprises no media-specific equipment.

16. The medium of claim 12 wherein:
the communications layer further directs handling of events according to the accumulated reported events.

17. The medium of claim 12 wherein:
the communications layer provides information on the accumulated reported events to the business layer.

18. The medium of claim 12 wherein:
the business layer manages business services by managing transactions each comprising one or more communications and that provide the business services, by defining business rules and applying them to the transactions to develop dialogs which it supplies to the communications layer;
the communications layer translates the supplied dialogs into translations that it uses to control the contact layer and translations that it supplies to the contact layer; and
the handlers of the contact layer use includes computer instructions that manage the translations supplied thereto to manage the contacts.

19. The medium of claim 18 wherein:
the business layer supplies to the communications layer definitions of reports requested by the business and forms the reports from data collected by the communications layer; and
the communications layer translates the definitions of the reports into database schema that accommodate data that the communications layer must collect for those reports.

20. The medium of claim 18 wherein:
the business rules include resource scheduling rules, resource behavior rules, service target rules, and customer treatment rules.

21. The medium of claim 18 wherein:
the business layer further has access to customer data which it applies to the transactions to develop the dialogs.

22. The medium of claim 12 wherein:
the business layer effects scheduling and adherence tracking of resources by providing business information to the communications layer and obtaining accumulated reported events from the communications layer.

23. The medium of claim 12 wherein:
the business layer provides an interface for the business to the customer care center for providing information to and obtaining information from the customer care center.

24. The medium of claim 12 wherein:
the contact layer handlers include computer instructions that manage the contacts in a default manner in an absence of the directions from the communications layer; and
the communications layer manages the communications in a default manner in an absence of the directions from the business layer.

25. The customer care center of claim 1 wherein:
the contact layer handlers include computer instructions that manage the contacts in a default manner in an absence of the directions from the communications layer; and
the communications layer manages the communications in a default manner in an absence of the directions from the business layer.

* * * * *